(12) United States Patent
Pham et al.

(10) Patent No.: US 7,377,951 B2
(45) Date of Patent: May 27, 2008

(54) PROCESS TO UTILIZE LOW-TEMPERATURE WASTE HEAT FOR THE PREPARATION OF SYNTHESIS GAS

(75) Inventors: Hoanh Nang Pham, Allentown, PA (US); Blaine Edward Herb, New Tripoli, PA (US); Geoffrey Colling Achilles, Rancho Palos Verdes, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 594 days.

(21) Appl. No.: 11/106,781

(22) Filed: Apr. 15, 2005

(65) Prior Publication Data

US 2006/0231463 A1  Oct. 19, 2006

(51) Int. Cl.
*C01B 3/00* (2006.01)
*B01J 8/00* (2006.01)
(52) U.S. Cl. .................... 48/197 R; 48/127.9
(58) Field of Classification Search ........ 208/133–141; 48/127.9, 197 R
See application file for complete search history.

(56) References Cited

U.S. PATENT DOCUMENTS

| 2,320,911 A | 6/1943 | Cooper |
| 3,071,453 A | 1/1963 | James |
| 3,532,467 A | 10/1970 | Smith et al. |
| 4,576,226 A | 3/1986 | Lipets et al. |
| 4,693,233 A | 9/1987 | Meith et al. |

*Primary Examiner*—Glenn Caldarola
*Assistant Examiner*—Randy Boyer
(74) *Attorney, Agent, or Firm*—Keith D. Gourley

(57) ABSTRACT

A steam-hydrocarbon reforming process generating a process gas containing a first amount of heat and a flue gas containing a second amount of heat includes: providing a water heater, a boiler feed water (BFW) preparation system, a boiler, and a BFW heater; feeding water to the water heater; feeding water to the BFW preparation system from the water heater; feeding a first stream of water to the boiler from the BFW preparation system; feeding a second stream of water from the BFW preparation system to the BFW heater; heating at least part of the second stream of water fed to the BFW heater with a first part of the first amount of heat; heating water in the boiler with a second part of the first amount of heat; generating steam at 5-60 psig in the boiler; and heating the BFW preparation system or another internal system with the steam.

20 Claims, 5 Drawing Sheets

PROCESS TO UTILIZE LOW-TEMPERATURE WASTE HEAT FOR THE PREPARATION OF SYNTHESIS GAS

BACKGROUND OF THE INVENTION

The present invention relates to processes and systems for the production of synthesis gas by steam reforming, and in particular to improved integration in such processes and systems so as to increase the recovery of waste heat, improve thermal efficiency, and eliminate or minimize air preheater corrosion.

A typical conventional steam reforming process and system shown in FIG. 1 includes feed pre-treatment 12, optional pre-reforming (not shown), steam hydrocarbon reforming 15, a waste heat recovery train for the process gas stream, and a waste heat recovery train for the flue gas stream. The waste heat recovery train for the process gas stream includes a waste heat boiler 18, a shift converter 21, a feed preheater 22, a boiler feed water heater 24, a water heater 26, a boiler feed water preparation system 32, a cooling train 29, and a hydrogen purification by pressure swing adsorption (PSA) system 35. The waste heat recovery train for the flue gas stream includes process heating coils 38, a steam generating system 39, an air preheater 42, and an induced draft (ID) fan 45.

The feed pre-treatment 12 usually involves preheating the hydrocarbon feed 11 and removing sulfur, chlorine, and other catalyst poisons from the hydrocarbon feed. The treated hydrocarbon feed gas 13 is mixed with process steam 14 and fed into the steam-hydrocarbon reformer 15 in which the mixed feed is converted to synthesis gas or process gas over a nickel catalyst bed at temperatures of 800° C. to 950° C. Heat is supplied by combusting the PSA purge gas 37 and a portion of the hydrocarbon feed 10 through multiple burners (not shown).

Heat from the process gas 17 leaving the steam-hydrocarbon reformer 15 is used to generate high-pressure steam in the waste heat boiler 18 before the process gas enters the adiabatic water gas shift converter 21. In the shift converter, carbon monoxide reacts with water and converts to carbon dioxide and hydrogen over a catalyst bed. Heat from the process gas 20 exiting the shift converter is supplied to the hydrocarbon feed preheater 22, the boiler feed water (BFW) heater 24, and the make-up water heater 26. The residual heat, usually at low temperature, from the process gas is then rejected into the environment in the cooling train 29.

The condensate 31 from the process gas resulting from the heat recovery is separated and returned to the boiler feed water preparation system 32, where the condensate 31 is combined with the make-up water 27 from the water heater 26. The combined liquid stream 33 is fed into the BFW heater 24. The heated BFW stream 30 exiting the BFW heater is sent to the steam system 49.

Finally, hydrogen product 36 is separated from the process gas in the PSA system 35. The PSA off gas 37 is returned and combusted in the reformer to supply heat to the reforming process.

The points where the temperature of one stream (heat source) gets close to the temperature of another stream (heat sink) are called "pinch points." Pinch points reduce the temperature difference driving force for heat transfer. Therefore, a significant amount of surface area is required to recover a small amount of heat from the heat source.

More than half of the energy content in the process gas 20 exiting the shift converter 21 is the heat of moisture condensation. Unfortunately, the condensation exhibits a pinch as the process gas cools down. The pinch limits the ability to recover the heat from the process gas. As a result, a significant amount of residual heat from the process gas is rejected into the environment through the cooling train 29. Depending on the process requirement, the heat rejection could be about 20% to 25% of the total heat contained in the process gas stream exiting the shift converter.

The sensible heat from the flue gas 16 leaving the steam-hydrocarbon reformer 15 is recovered by preheating the mixed feed in the process heating coils 38 and generating additional high-pressure steam in the steam generating system 39. The flue gas stream 41 exiting the flue gas boiler is continued to preheat the combustion air 48 that is supplied by the forced draft (FD) fan 47 in the air preheater 42. The temperature of the flue gas 44 leaving the air preheater is usually cooled down to about 300° F. before the flue gas 46 is released to the atmosphere through the ID fan 45. At this temperature, the flue gas still contains a large amount of energy that is more than half of the total energy lost in the reforming plant.

It is difficult to recover the low grade or low-temperature heat (<300° F.) from the flue gas because (1) there is not a sufficient quantity of the combustion air to absorb all of the available heat, and (2) corrosion problems in the air preheater require maintaining a sufficiently high flue gas temperature to avoid moisture and/or sulfur condensation. Consequently, a significant amount of heat is rejected into the environment.

U.S. Pat. No. 3,071,453 (James) discloses a hydrocarbon reforming process in which steam is generated from the process gas waste heat at a pressure between 25 psig to 100 psig. The low-pressure steam is then super-heated and expanded in a steam turbine to generate power that drives the product gas compression. As a result, the reform process produces a high-pressure hydrogen-containing gas stream in a more efficient manner. The process utilizes the thermal energy available in the hot reformed gas to eliminate or reduce the external power requirement for product compression.

U.S. Pat. No. 3,532,467 (Smith, et al.) teaches how a steam turbine and a steam reformer can be integrated to maximize the heat recovery through steam usage. The process utilizes high-pressure steam (400 psig to 1600 psig) to drive a hydrogen-rich gas centrifugal compressor. The steam exhausted from the steam turbine at 50 psig to 350 psig is used as process steam for the steam reforming reactions. The process gas from the steam reformer is passed through the waste heat boiler, high-temperature shift, and low-temperature shift to convert most of the CO to CO2. The process gas containing mostly hydrogen, CO2, and water is cooled in a cooling train including a low-pressure steam generator and a water cooler. The gas is separated from the condensate before entering the centrifugal compressor.

The waste heat from the process gas after the shift converter is recovered by generating low-pressure steam at about 40 psig. The patent (Smith, et al.) suggests use of the low-pressure steam in the CO2 removal system. If the use of the low-pressure steam is limited to the requirement of the CO2 removal system, significant low-temperature waste heat may still be rejected to the environment through the cooling train.

U.S. Pat. No. 4,576,226 (Lipets, et al.) suggests several options to eliminate the air corrosion problem in the air preheater: (1) heated air recirculation with a forced draft (FD) fan, (2) air by-pass, and (3) preheated cold air with low-pressure steam extract from a steam turbine. Although these options are feasible to eliminate the corrosion, each option has one or more disadvantages.

For example, the heated air recirculation option requires a FD fan, power, and associated equipment. It also reduces the heat transfer performance of the air preheater. Therefore, to achieve the same heat recovery from the flue gas, more heat transfer surface area must be added to the air preheater.

The use of low-pressure steam from a steam turbine to preheat the cold air would suffer energy loss or power loss from the turbine and would also recover less heat from the flue gas if no additional heat transfer surface was added.

The air by-pass option suffers heat loss due to less heat recovery from the flue gas. U.S. Pat. No. 2,320,911 (Cooper), which controls cold air flowrate by a damper to maintain metal temperature above the flue gas dew point, suffers from the same problem.

U.S. Pat. No. 4,693,233 (Meith, et al.) discloses the use of a tubular type air preheater in which the hot flue gas flows in the tube side and cold air is in the shell side. The flue gas inside the tube is maintained at a superficial velocity of 10 ft/sec. to 100 ft/sec. Heated air is recirculated to maintain metal temperature in such a way that the droplets formed on the inside of the tube are sufficiently small and can be removed by the high velocity flue gas. As a result, no large droplets or condensation flow occurs in the tube. The high gas velocity, however, would require more fan power. The heated air re-circulation would suffer the same disadvantages described above. The control of metal temperature to generate small droplets is critical and complicates the air preheater design.

It is desired to have an integrated steam reforming process and system which maximize the use of low-pressure steam and increase the recovery of waste heat from the flue gas to result in an improved overall thermal efficiency relative to the prior art.

It is further desired to eliminate or minimize corrosion in the air preheater of the steam reforming process and system.

It is also desired to have a steam reforming process and system which afford better performance than the prior art, and which also overcome many of the difficulties and disadvantages of the prior art to provide better and more advantageous results.

BRIEF SUMMARY OF THE INVENTION

The invention is a process and a system for steam reforming hydrocarbons in a steam-hydrocarbon reformer receiving a flow of hydrocarbon feed and a flow of steam, the steam-hydrocarbon reformer generating a flow of a process gas containing a first amount of heat and a flow of a flue gas containing a second amount of heat. There are several embodiments and variations of the process, and several embodiments and variations of the system.

In the discussion of the present invention, reference is made to "eventually feeding" and "eventually heating" a stream or a portion of a stream (or similar terms or phrases). It will be understood by persons skilled in the art that, with regard to the process, this terminology means that other processing steps may (or may not) exist before the stream or portion of the stream is heated or is fed to a certain location (or transmitted, etc.). With regard to the system, this terminology means that other means for carrying out other processing steps may (or may not) exist before the stream or portion of the stream is heated or is fed to a certain location (or transmitted, etc.).

A first embodiment of the process includes multiple steps. The first step is to provide a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 60 psig. The second step is to feed a flow of water to the water heater. The third step is to eventually feed at least a portion of the water from the water heater to the boiler feed water preparation system. The fourth step is to feed a first stream of the water to the boiler from the boiler feed water preparation system. The fifth step is to feed a second stream of the water from the boiler feed water preparation system to the first boiler feed water heater. The sixth step is to eventually heat at least a portion of the second stream of the water fed to the first boiler feed water heater with a first portion of the first amount of heat at a first temperature. The seventh step is to eventually heat at least a portion of the water in the boiler with a second portion of the first amount of heat. The eighth step is to generate the stream of steam at the pressure between about 5 psig and about 60 psig in the boiler. The ninth step is to eventually heat with at least a portion of the stream of steam the boiler feed water preparation system or another internal system in direct or indirect fluid communication with the steam-hydrocarbon reformer. In a variation of the first embodiment, the generated stream of steam is at a pressure between about 5 psig and about 40 psig.

A second embodiment of the process is similar to the first embodiment, but includes additional steps. The first additional step is to provide a second boiler feed water heater and a third boiler feed water heater. The second additional step is to feed a first portion of a third stream of the water from the first boiler feed water heater to the second boiler feed water heater. The third additional step is to feed a second portion of the third stream of the water from the first boiler feed water heater to the third boiler feed water heater. The fourth additional step is to eventually heat at least a portion of the first portion of the third stream of the water fed to the second boiler feed water heater with a third portion of the first amount of heat at a second temperature higher than the first temperature. The fifth additional step is to eventually heat at least a portion of the second portion of the third stream of the water fed to the third boiler feed water heater with a first portion of the second amount of heat at a primary temperature.

A third embodiment of the process is similar to the second embodiment of the process but includes sixth, seventh, and eighth additional steps. The sixth additional step is to provide a fuel preheater. The seventh additional step is to feed a flow of a fuel to the fuel preheater. The eighth additional step is to eventually heat at least a portion of the fuel in the fuel preheater with a fourth portion of the first amount of heat at a third temperature lower than the second temperature.

A fourth embodiment of the process is similar to the first embodiment, but includes additional steps. The first additional step is to provide an oxidant preheater. The second additional step is to provide a stream of an oxidant. The third additional step is to heat at least a portion of the stream of the oxidant with an other portion of the stream of steam or with a flow of warm air from a cooling train or from an other internal source in direct or indirect fluid communication with the steam-hydrocarbon reformer. The fourth additional step is to feed the heated stream of the oxidant to the oxidant preheater. The fifth additional step is to eventually further heat the at least a portion of the heated stream of the oxidant in the oxidant preheater with a second portion of the second amount of heat at a secondary temperature. In a variation of the fourth embodiment, the oxidant is air or another gaseous mixture having an oxygen concentration greater than about 10%.

A fifth embodiment of the process is similar to the first embodiment, but includes additional steps. The first additional step is to provide an economizer. The second additional step is to transmit a stream of at least a portion of the water from the water heater through the economizer before eventually feeding the at least a portion of the portion of the water to the boiler feed water preparation system. The third additional step is to eventually heat the stream of the at least a portion of the water being transmitted through the economizer with a second portion of the second amount of heat at another temperature.

A sixth embodiment of the process is similar to the second embodiment of the process, but includes the additional steps set forth above with respect to the fourth embodiment of the process. In a variation of the sixth embodiment, the oxidant is a gaseous mixture other than air having an oxygen concentration greater than about 10%.

A seventh embodiment of the process is similar to the second embodiment of the process, but includes the additional steps set forth above with regard to the fifth embodiment of the process.

A first embodiment of the system includes multiple elements. The first element is a group of equipment including a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 60 psig. The second element is a means for feeding a flow of water to the water heater. The third element is a means for eventually feeding at least a portion of the water from the water heater to the boiler feed water preparation system. The fourth element is a means for feeding a first stream of the water to the boiler from the boiler feed water preparation system. The fifth element is a means for feeding a second stream of the water from the boiler feed water preparation system to the first boiler feed water heater. The sixth element is a means for eventually heating at least a portion of the second stream of the water fed to the first boiler feed water heater with a first portion of the first amount of heat at a first temperature. The seventh element is a means for eventually heating at least a portion of the water in the boiler with a second portion of the first amount of heat. The eighth element is a means for generating the stream of steam at the pressure between about 5 psig and about 60 psig in the boiler. The ninth element is a means for eventually heating with at least a portion of the stream of steam the boiler feed water preparation system or another internal system in direct or indirect fluid communication with the steam-hydrocarbon reformer. In a variation of the first embodiment of the system, the generated stream of steam is at a pressure between about 5 psig and about 40 psig.

A second embodiment of the system is similar to the first embodiment of the system, but includes additional elements. The first additional element is an equipment group including a second boiler feed water heater and a third boiler feed water heater. The second additional element is a means for feeding a first portion of a third stream of the water from the first boiler feed water heater to the second boiler feed water heater. The third additional element is a means for feeding a second portion of the third stream of the water from the first boiler feed water heater to the third boiler feed water heater. The fourth additional element is a means for eventually heating at least a portion of the first portion of the third stream of the water fed to the second boiler feed water heater with a third portion of the first amount of heat at a second temperature higher than the first temperature. The fifth additional element is a means for eventually heating at least a portion of the second portion of the third stream of the water fed to the third boiler feed water heater with a first portion of the second amount of heat at a primary temperature.

The third embodiment of the system is similar to the second embodiment of the system but includes sixth, seventh, and eighth additional elements. The sixth additional element is a fuel preheater. The seventh additional element is a means for feeding a flow of a fuel to the fuel preheater. The eighth additional element is a means for eventually heating at least a portion of the fuel in the fuel preheater with a fourth portion of the first amount of heat at a third temperature lower than the second temperature.

A fourth embodiment of the system is similar to the first embodiment but includes additional elements. The first additional element is an oxidant preheater. The second additional element is a source of a stream of an oxidant. The third additional element is a means for heating at least a portion of the stream of the oxidant with an other portion of the other stream of steam or with a flow of warm air from a cooling train or from an other internal source in direct or indirect fluid communication with the steam-hydrocarbon reformer. The fourth additional element is a means for feeding the heated stream of the oxidant to the oxidant preheater. The fifth additional element is a means for eventually further heating the at least a portion of the heated stream of the oxidant in the first oxidant preheater with a second portion of the second amount of heat at a secondary temperature. In a variation of the fourth embodiment of the system, the oxidant is air or another gaseous mixture having an oxygen concentration greater than about 10%.

A fifth embodiment of the system is similar to the first embodiment of the system, but includes additional elements. The first additional element is an economizer. The second additional element is a means for transmitting a stream of at least a portion of the water from the water heater through the economizer before eventually feeding the at least a portion of the portion of the water to the boiler feed water preparation system. The third additional element is a means for eventually heating the stream of the at least a portion of the water being transmitted through the economizer with a second portion of the second amount of heat at another temperature.

A sixth embodiment of the system is similar to the second embodiment of the system, but includes the additional elements set forth above for the fourth embodiment of the system. In a variation of the sixth embodiment of the system, the oxidant is a gaseous mixture other than air having an oxygen concentration greater than about 10%.

A seventh embodiment of the system is similar to the second embodiment of the system, but includes the additional elements set forth above for the fifth embodiment of the system.

BRIEF DESCRIPTION OF THE DRAWINGS

The invention will be described by way of example with reference to the accompanying drawings, in which.

DETAILED DESCRIPTION OF THE INVENTION

The present invention is an integration process that improves the overall efficiency of a steam reforming plant to produce syngas or hydrogen. A low-pressure (LP) steam is generated from the process gas waste heat downstream of the boiler feed water (BFW) preheater. The LP steam is used to warm the cold air before the air enters the air preheater, thereby eliminating or minimizing the corrosion problem in the air preheater. The LP steam is also used to replace the high-pressure steam in the BFW preparation system. As an alternative, warm air from the cooling train (or another internal source) can be used to replace the LP steam to eliminate the air preheater corrosion problem.

The boiler feed water is preheated in a first stage of the BFW preheater to a temperature between 300° F. and 390° F., preferably between 330° F. and 370° F., before it is split into two liquid streams. One liquid stream is returned and heated in a second stage of the BFW preheater, and the second liquid stream is further heated in the flue gas stream. The second liquid stream is used to open a cooling curve pinch in the flue gas side. The elimination of the corrosion problem and the opening of the cooling curve pinch allow a further recovery of the flue gas sensible heat before it is released to the environment via a stack. In addition, the split of the boiler feed water also opens (or minimizes the effect of) the cooling curve pinch in the process gas, which allows further recovery of the process gas heat compared to conventional steam reforming plants.

Figure 1:
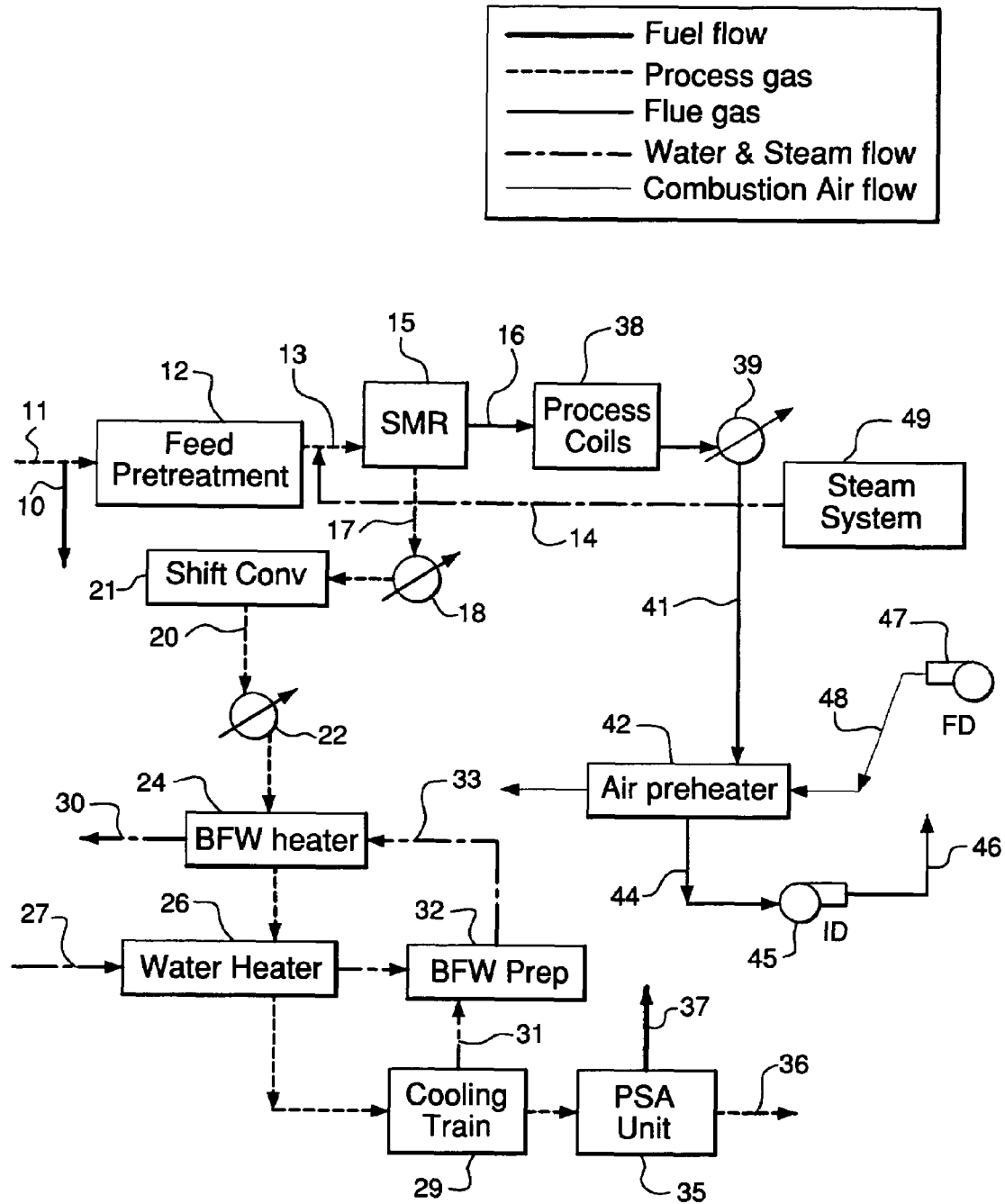
FIG. 1 is a schematic flow diagram of a typical prior art steam-hydrocarbon reforming process and system.

Several embodiments of the present invention are illustrated in FIGS. 2-5, wherein the reference numerals therein common to the reference numerals in FIG. 1 refer to like elements, flows, and streams. The discussion of the embodiments illustrated in FIGS. 2 and 3 refers to "air" and "air" preheaters. However, persons skilled in the art will recognize that oxidants other than air may be used in those embodiments and other variations.

Oxidant is the source of oxygen necessary to react with a fuel and release the energy in the fuel. An oxidant may be air, pure oxygen, oxygen-enriched air, depleted air having oxygen less than that atmospheric oxygen level, such as from gas turbine exhaust, or a mixture of any of these types with furnace gas, such as is used in gas recirculation applications. The oxidants listed herein are provided by way of example only and do not limit the scope of the present invention, as persons skilled in the art will recognize that the invention may be used with other oxidants, as well as many combinations and mixtures of various oxidants and oxidant streams.

Figure 2:
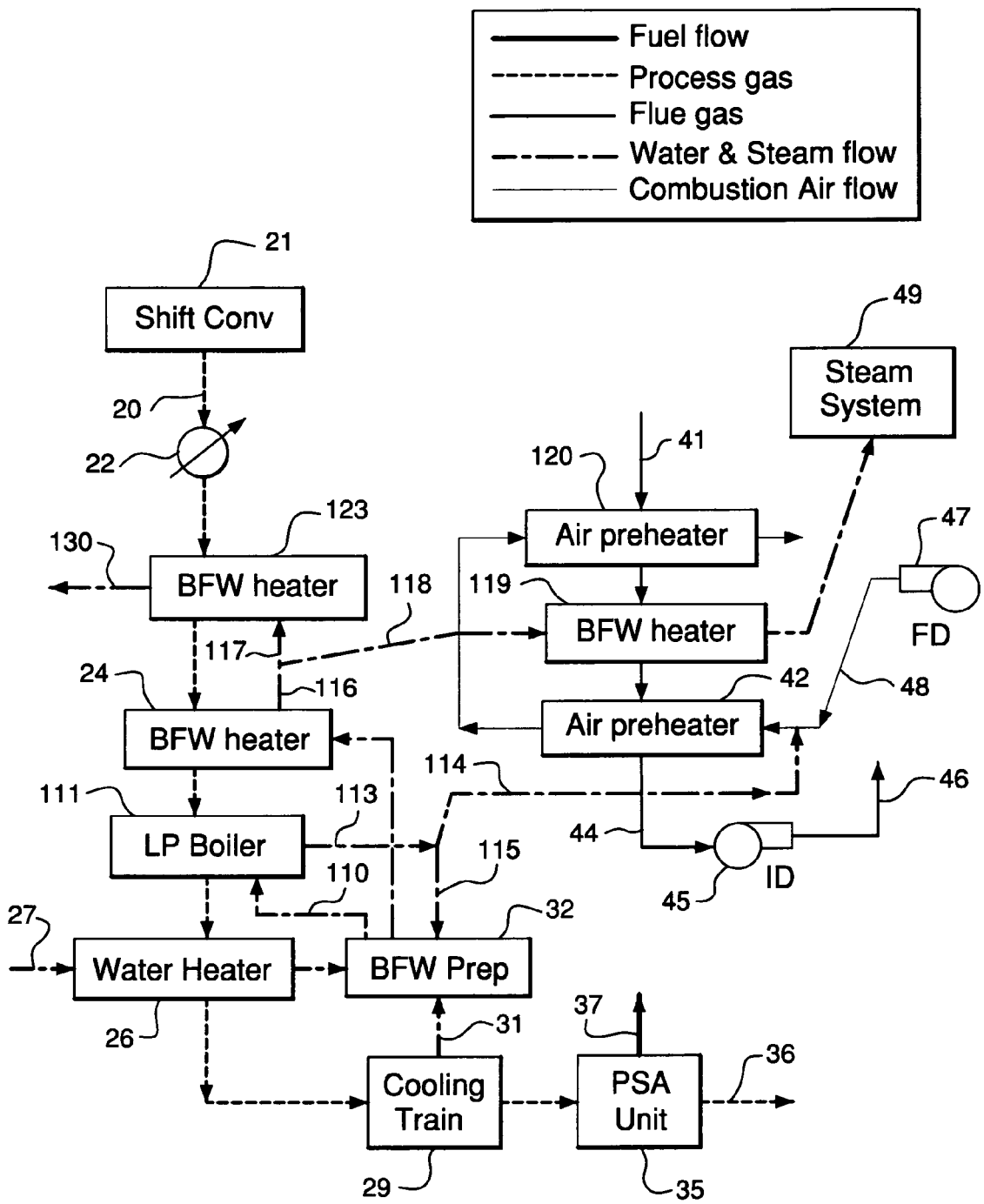
FIG. 2 is a schematic flow diagram of an embodiment of the present invention.

In one embodiment of the invention shown in FIG. 2, a water stream 110 is taken from the boiler feed water (BFW) preparation system 32 and is pumped to a low pressure (LP) boiler 111, such as a kettle type boiler. Low-pressure steam 113 between 5 psig to 60 psig, preferably between 5 psig to 40 psig, is generated in the LP boiler using the process gas waste heat, preferably but not necessarily, from the outlet of the BFW heater 24. A portion of the LP steam 114 is used to indirectly heat the cold stream of combustion air 48 before that stream enters the air preheater 42. As a result, some of the waste heat from the process stream is indirectly used to warm the combustion air before that air enters the air preheater.

The warmed combustion air 48 sufficiently maintains the metal temperature of the air preheater 42 above the gas dew point of the flue gas stream 41. Therefore, the high temperature requirement of the flue gas is no longer required to avoid the air preheater corrosion problem of prior art processes/systems. Hence, a greater amount of the sensible heat from the flue gas can be recovered.

To recover the low-temperature sensible heat from the flue gas, a BFW stream 116 is preheated to a temperature between 300° F. to 390° F., preferably between 330° F. to 370° F., in the BFW heater 24 and is split into two streams. The first stream 118 is sent to the BFW heater 119 in the flue gas side upstream of the air preheater 42, and the second stream 117 is further heated in the BFW heater 123. The heated BFW stream 130 exiting the BFW heater 123 is sent to the steam system 49. In the flue gas BFW heater 119, the withdrawn BFW stream 118 is further heated by the flue gas and sent to the steam system 49.

The air preheater is also split into two stages. The first stage is the air preheater 42, and the second stage is the air preheater 120. The BFW heater 119 is located in the middle of the two air preheaters to complete the integration.

A portion of the LP steam 115 is used as a heat source to replace the high-pressure letdown steam that is used in the BFW preparation system 32, low-pressure condensate stripper (not shown), ammonia evaporization system (not shown), or any other internal system (not shown) requiring low-temperature or low grade heat.

Figure 3:
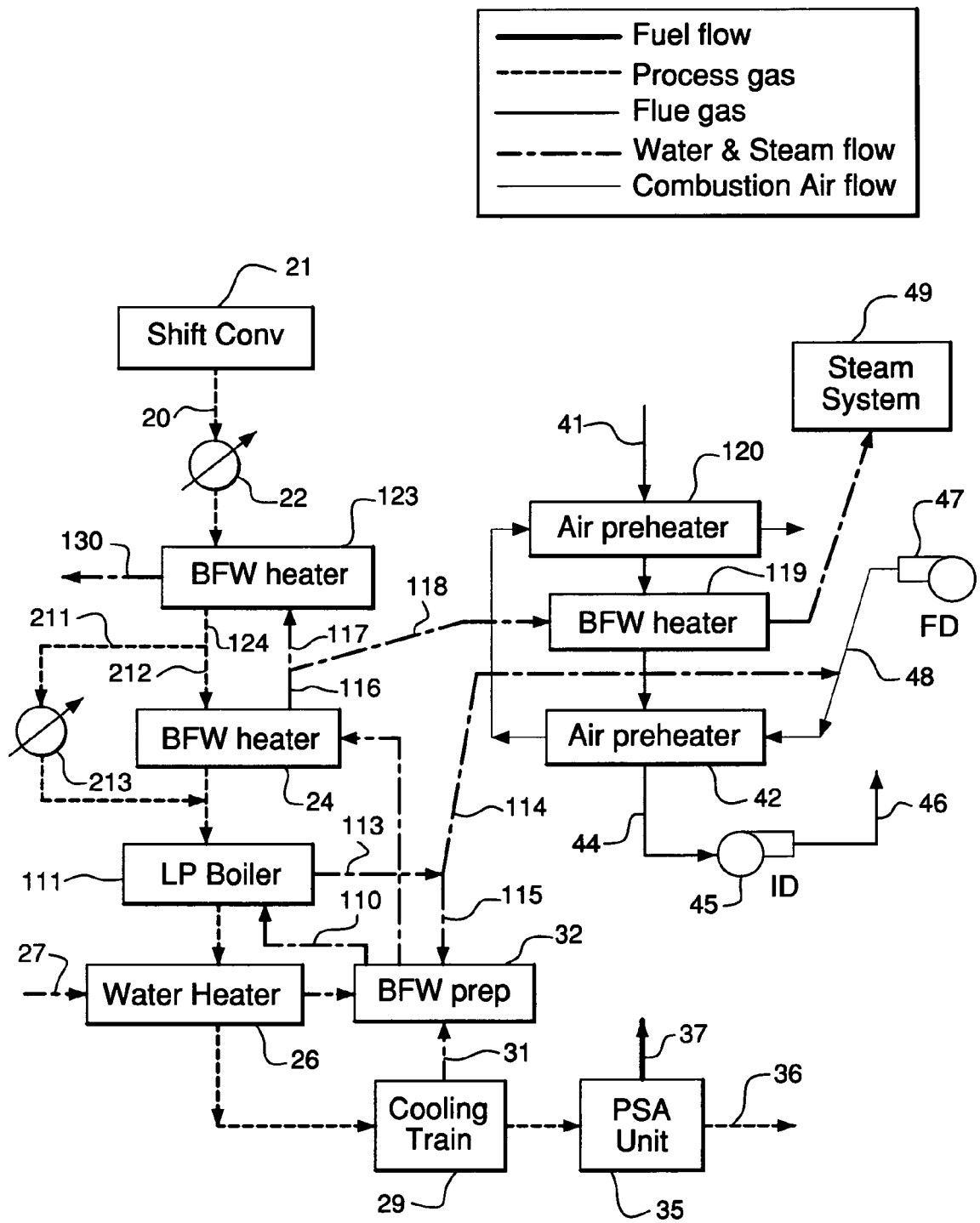
FIG. 3 is a schematic flow diagram of another embodiment of the present invention.

In another embodiment of the invention shown in FIG. 3, the process gas 124 exits the BFW heater 123 and is split into two gas streams. One gas stream 211 is used to provide heat for the internal process, such as for the feed or fuel preheater 213. The second stream 212 is used to heat the boiler feed water in the BFW heater 24. In this arrangement, the LP boiler 111 can be placed downstream of the feed or fuel heater 213, or after the two gas streams (211, 212) are re-combined, as shown in FIG. 3.

Figure 4:
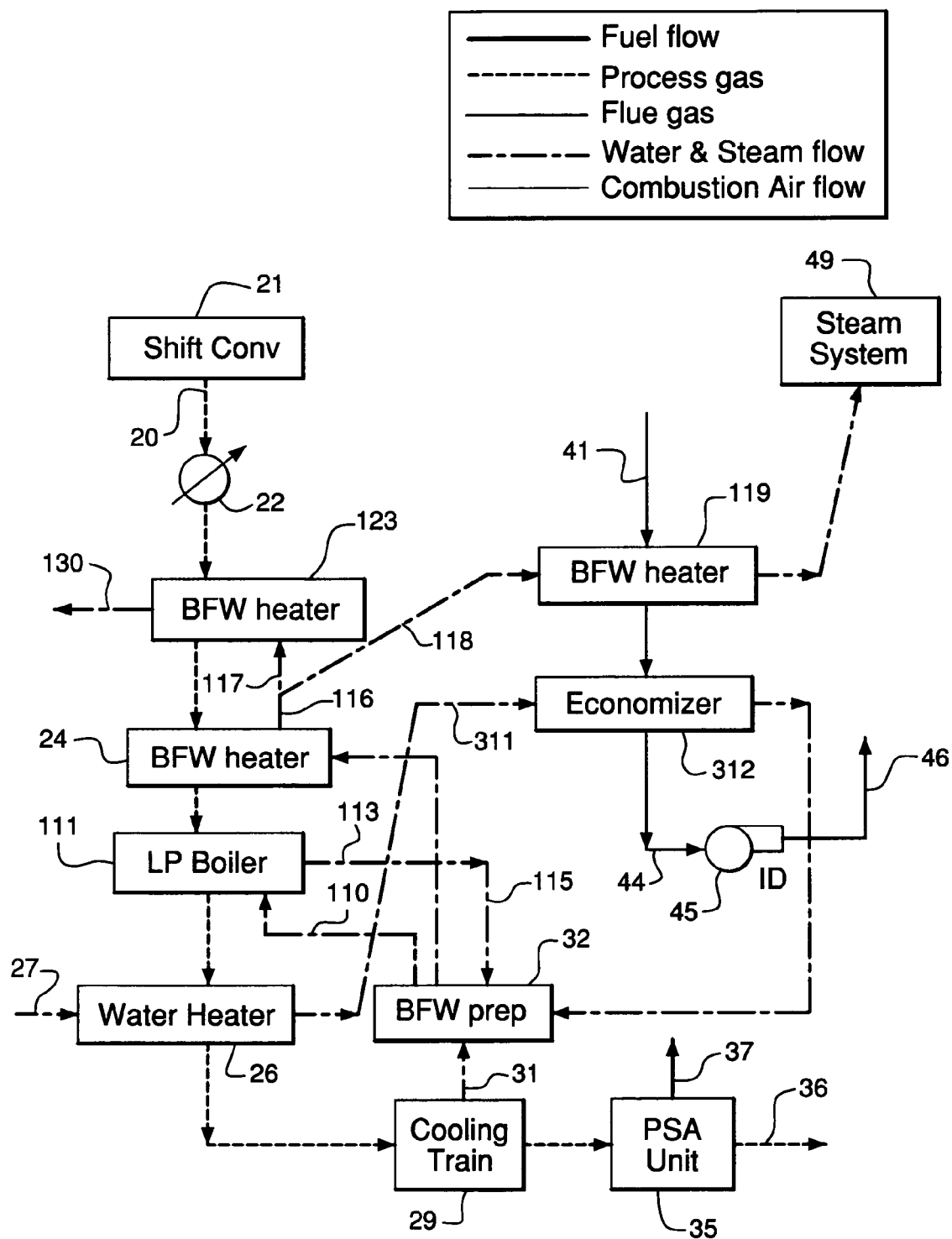
FIG. 4 is a schematic flow diagram of another embodiment of the present invention.

Another embodiment of the invention is shown in FIG. 4 in which the steam reforming plant does not have an air preheater. The make-up water 27 or demineralized water is pre-heated in the make-up water heater 26. The warm water 311 from the outlet of the make-up water heater is further heated in the economizer 312 in the flue gas side before the warm water is sent to the BFW preparation system 32.

Figure 5:
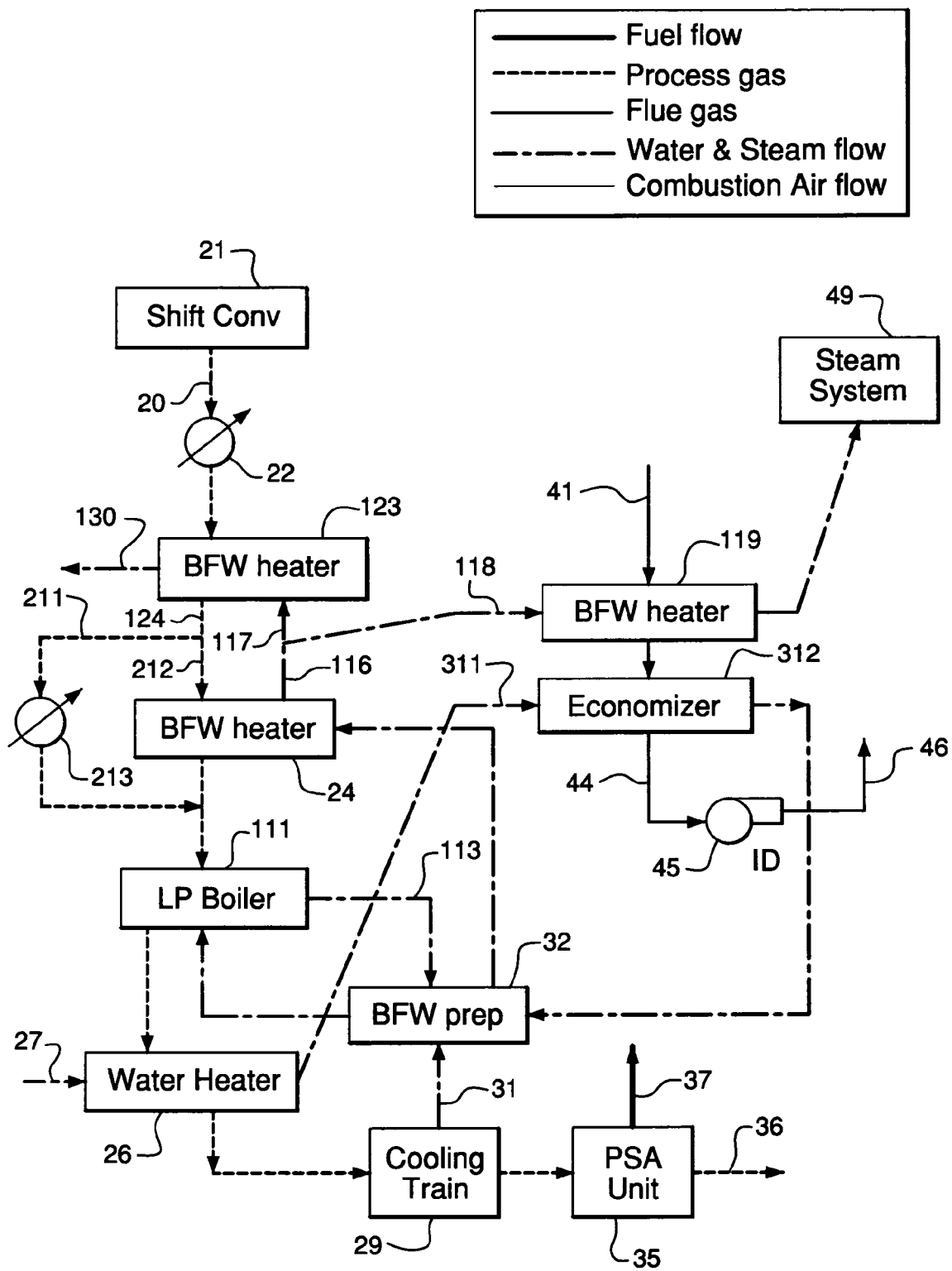
FIG. 5 is a schematic flow diagram of another embodiment of the present invention.

Another embodiment of the invention is shown in FIG. 5 in which the steam reforming plant does not have an air preheater. The process gas 124 downstream of the BFW heater 123 is split into two gas streams. One gas stream 211 is used to provide heat for the internal process, such as feed or fuel, and the second stream 212 is used to heat the boiler feed water in the BFW heater 24. In this arrangement, the LP boiler 111 can be placed downstream of the feed or fuel heater 213, or at a location after the two gas streams (211, 212) are re-combined, as shown in FIG. 5. The make-up water or demineralized water 27 is preheated in the make-up water heater 26 and further heated in the economizer 312 in the flue gas side before the warm water is sent to the BFW preparation system 32.

In another variation of the integrated process, warm air from the cooling train 29 (or another internal source) is used instead of low-pressure steam from the LP boiler 111 to preheat the cold combustion air 48 before it enters the air preheater 42 to eliminate or minimize corrosion problems in the air preheater.

There are several benefits from the process integration of the present invention. First, the heat from the LP steam is utilized to warm the cold combustion air before the air enters the air preheater. The cold combustion air commonly causes corrosion problems in the air preheater, especially during cold seasons. Therefore, the design temperature of the flue gas leaving the air preheater usually is sufficiently high in conventional steam reformer plants to avoid this problem. The high flue gas temperature leaving the air preheater results in an energy loss through the stack to the environment. The use of LP steam eliminates the corrosion problem and allows the flue gas to leave the air preheater at a much lower temperature.

Second, there is a cooling-curve pinch in the BFW preheater due to the condensation of water in the process gas. The process gas pinch limits the ability to recover more heat from the process gas exiting the shift converter. The BFW split, or the split of the process gas suggested in the present invention, opens (or minimizes the effect of) the pinch and allows more heat recovery from the process gas.

Third, the corrosion in the air preheater is resolved by the use of the LP steam. However, the recovery of the flue gas sensible heat in the air preheater is limited due to a cooling curve pinch in the air preheater. The BFW stream from the process gas side is further heated in the flue gas side upstream of the air preheater to open the air preheater pinch, which makes possible an additional heat recovery from the flue gas.

Fourth, the LP steam replaces the high-pressure letdown steam, which allows the plant to export additional high-pressure steam.

Finally, the LP boiler recovers heat from the process gas, which heat would normally be rejected in the cooling train. Therefore, the equipment required for the cooling train is significantly reduced, as is the duty of that equipment.

The reduction of the process gas waste heat in the cooling train and the additional heat recovery from the flue gas significantly improve the overall efficiency of the integrated process of the present invention relative to conventional SMR processes. By recovering substantial amounts of waste heat which would otherwise be rejected to the environment through the cooling train and the ID fan by conventional processes/systems, the present invention improves the overall efficiency of a steam reforming plant.

EXAMPLE

To demonstrate the efficiency improvement of the integrated process of the present invention over the prior art processes, Table 1 provides the results of simulations of the processes shown in FIG. 1 (prior art) and FIG. 2 (present invention). In both processes, the hydrogen production rate is 4,000,000 standard cubic feet per hour. Both processes consume the same amount of energy as feed to the reforming process and supplemental fuel to the reformer furnace.

| Steam Methane Reforming (SMR) Process | | Prior Art Process FIG. 1 | Present Invention FIG. 2 |
|---|---|---|---|
| Hydrogen production capacity | MM scfh | 4.00 | 4.00 |
| Net steam production rate (645 psi/750° F.) | Klb/hr | 160,000 | 186,000 |
| Total natural gas consumption | MM Btu/hr | 1,727 | 1,728 |
| BFW mass flow to the flue gas side @350° F. | lb/hr | 0 | 155,000 |
| Flue gas flow rate | lb/hr | 736,000 | 738,000 |
| Flue gas inlet temperature to ID fan | ° F. | 300 | 265 |
| Process gas flow rate | lb/hr | 288,500 | 289,550 |
| Process gas temperature to cooling train | ° F. | 260 | 197 |
| Low pressure steam flow rate (45 psi/275° F.) | lb/hr | 0 | 22,000 |
| Additional energy recovery from flue gas | MM Btu/hr | 0 | 6.96 |
| Additional energy recovery from process gas | MM Btu/hr | 0 | 30.07 |

In the embodiment of the present invention shown in FIG. 2, the stream 118 from BFW heater 24 is withdrawn at a temperature of 350° F. and a flow rate of 155,000 lb/hr. The LP steam boiler 111, downstream of the BFW heater 24, generates 22,000 lb per hour steam at 275° F. and 45 psi. Half of the low-pressure steam is utilized in the boiler feed water preparation system 32 and the other half is used to preheat the cold combustion air 48.

The simulation results show that the integrated process of the present invention recovers about 30 MM Btu per hour from the process gas cooling train 29, which results in a drop of 63° F. in the temperature of the process gas stream going to the cooling train. At the same time, this process recovers about 7 MM Btu per hour from the flue gas, which results in a drop of 35° F. in the temperature of the flue gas stream 46 going to the stack column. As a result, a total of 37 MM Btu per hour of additional energy has been recovered from the waste heat of the process gas and the waste heat of the flue gas. The effective use of the low-pressure steam in the internal process of the present invention results in an addition of 26,000 lb per hour of high-pressure steam (@750° F. and 645 psi) above the steam production of the prior art process. Consequently, the overall thermal efficiency of the steam hydrocarbon reforming process is significantly improved and less heat is rejected into the environment.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A process for steam reforming hydrocarbons in a steam-hydrocarbon reformer receiving a flow of hydrocarbon feed and a flow of steam, the steam-hydrocarbon reformer generating a flow of a process gas containing a first amount of heat and a flow of a flue gas containing a second amount of heat, comprising the steps of:

providing a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 60 psig;

feeding a flow of water to the water heater;

eventually feeding at least a portion of the water from the water heater to the boiler feed water preparation system;

feeding a first stream of the water to the boiler from the boiler feed water preparation system;

feeding a second stream of the water from the boiler feed water preparation system to the first boiler feed water heater;

eventually heating at least a portion of the second stream of the water fed to the first boiler feed water heater with a first portion of the first amount of heat at a first temperature;

eventually heating at least a portion of the water in the boiler with a second portion of the first amount of heat;

generating the stream of steam at the pressure between about 5 psig and about 60 psig in the boiler; and eventually heating with at least a portion of the stream of steam the boiler feed water preparation system or another internal system in direct or indirect fluid communication with the steam-hydrocarbon reformer.

2. A process as in claim 1, comprising the further steps of:

providing a second boiler feed water heater and a third boiler feed water heater;

feeding a first portion of a third stream of the water from the first boiler feed water heater to the second boiler feed water heater;

feeding a second portion of the third stream of the water from the first boiler feed water heater to the third boiler feed water heater;

eventually heating at least a portion of the first portion of the third stream of the water fed to the second boiler feed water heater with a third portion of the first amount of heat at a second temperature higher than the first temperature; and eventually heating at least a portion of the second portion of the third stream of the water fed to the third boiler feed water heater with a first portion of the second amount of heat at a primary temperature.

3. A process as in claim 2, comprising the further steps of:

providing a fuel preheater;

feeding a flow of a fuel to the fuel preheater; and eventually heating at least a portion of the fuel in the fuel preheater with a fourth portion of the first amount of heat at a third temperature lower than the second temperature.

4. A process as in claim 1, comprising the further steps of:

providing an oxidant preheater;

providing a stream of an oxidant;

heating at least a portion of the stream of the oxidant with an other portion of the stream of steam or with a flow of warm air from a cooling train or from an other internal source in direct or indirect fluid communication with the steam-hydrocarbon reformer;

feeding the heated stream of the oxidant to the oxidant preheater; and eventually further heating the at least a portion of the heated stream of the oxidant in the oxidant preheater with a second portion of the second amount of heat at a secondary temperature.

5. A process as in claim 1, comprising the further steps of:

providing an economizer;

transmitting a stream of at least a portion of the water from the water heater through the economizer before eventually feeding the at least a portion of the portion of the water to the boiler feed water preparation system; and eventually heating the stream of the at least a portion of the water being transmitted through the economizer with a second portion of the second amount of heat at another temperature.

6. A process as in claim 4, wherein the oxidant is air or another gaseous mixture having an oxygen concentration greater than about 10%.

7. A process as in claim 1, wherein the generated stream of steam is at a pressure between about 5 psig and about 40 psig.

8. A process for steam reforming hydrocarbons in a steam-hydrocarbon reformer receiving a flow of hydrocarbon feed and a flow of steam, the steam-hydrocarbon reformer generating a flow of a process gas containing a first amount of heat and a flow of a flue gas containing a second amount of heat, comprising the steps of:

providing a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 40 psig;

feeding a flow of water to the water heater;

eventually feeding at least a portion of the water from the water heater to the boiler feed water preparation system;

feeding a first stream of the water to the boiler from the boiler feed water preparation system;

feeding a second stream of the water from the boiler feed water preparation system to the first boiler feed water heater;

eventually heating at least a portion of the second stream of the water fed to the first boiler feed water heater with a first portion of the first amount of heat at a first temperature;

eventually heating at least a portion of the water in the boiler with a second portion of the first amount of heat;

generating the stream of steam at the pressure between about 5 psig and about 40 psig in the boiler;

eventually heating with at least a portion of the stream of steam the boiler feed water preparation system or another internal system in direct or indirect fluid communication with the steam-hydrocarbon reformer;

providing a second boiler feed water heater and a third boiler feed water heater;

feeding a first portion of a third stream of the water from the first boiler feed water heater to the second boiler feed water heater;

feeding a second portion of the third stream of the water from the first boiler feed water heater to the third boiler feed water heater;

eventually heating at least a portion of the first portion of the third stream of the water fed to the second boiler feed water heater with a third portion of the first amount of heat at a second temperature higher than the first temperature;

eventually heating at least a portion of the second portion of the third stream of the water fed to the third boiler feed water heater with a first portion of the second amount of heat at a primary temperature;

providing an oxidant preheater;

providing a stream of an oxidant;

heating at least a portion of the stream of the oxidant with an other portion of the stream of steam or with a flow of warm air from a cooling train or from an other internal source in direct or indirect fluid communication with the steam-hydrocarbon reformer;

feeding the heated stream of the oxidant to the oxidant preheater; and eventually further heating the at least a portion of the heated stream of the oxidant in the oxidant preheater with a second portion of the second amount of heat at a secondary temperature lower than the primary temperature.

9. A process for steam reforming hydrocarbons in a steam-hydrocarbon reformer receiving a flow of hydrocarbon feed and a flow of steam, the steam-hydrocarbon reformer generating a flow of a process gas containing a first amount of heat and a flow of a flue gas containing a second amount of heat, comprising the steps of:

providing a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 40 psig;

feeding a flow of water to the water heater;

eventually feeding at least a portion of the water from the water heater to the boiler feed water preparation system;

feeding a first stream of the water to the boiler from the boiler feed water preparation system;

feeding a second stream of the water from the boiler feed water preparation system to the first boiler feed water heater;

eventually heating at least a portion of the second stream of the water fed to the first boiler feed water heater with a first portion of the first amount of heat at a first temperature;

eventually heating at least a portion of the water in the boiler with a second portion of the first amount of heat;

generating the stream of steam at the pressure between about 5 psig and about 40 psig in the boiler;

eventually heating with at least a portion of the stream of steam the boiler feed water preparation system or another internal system in direct or indirect fluid communication with the steam-hydrocarbon reformer;

providing a second boiler feed water heater and a third boiler feed water heater;

feeding a first portion of a third stream of the water from the first boiler feed water heater to the second boiler feed water heater;

feeding a second portion of the third stream of the water from the first boiler feed water heater to the third boiler feed water heater;

eventually heating at least a portion of the first portion of the third stream of the water fed to the second boiler feed water heater with a third portion of the first amount of heat at a second temperature higher than the first temperature;

eventually heating at least a portion of the second portion of the third stream of the water fed to the third boiler feed water heater with a first portion of the second amount of heat at a primary temperature;

providing an economizer;

transmitting a stream of at least a portion of the water from the water heater through the economizer before eventually feeding the at least a portion of the portion of the water to the boiler feed water preparation system; and eventually heating the stream of the at least a portion of the water being transmitted through the economizer with a second portion of the second amount of heat at another temperature lower than the primary temperature.

10. A process as in claim 8, wherein the oxidant is a gaseous mixture other than air having an oxygen concentration greater than about 10%.

11. A system for steam reforming hydrocarbons in a steam-hydrocarbon reformer receiving a flow of hydrocarbon feed and a flow of steam, the steam-hydrocarbon reformer generating a flow of a process gas containing a first amount of heat and a flow of a flue gas containing a second amount of heat, comprising:

a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 60 psig;

means for feeding a flow of water to the water heater;

means for eventually feeding at least a portion of the water from the water heater to the boiler feed water preparation system;

means for feeding a first stream of the water to the boiler from the boiler feed water preparation system;

means for feeding a second stream of the water from the boiler feed water preparation system to the first boiler feed water heater;

means for eventually heating at least a portion of the second stream of the water fed to the first boiler feed water heater with a first portion of the first amount of heat at a first temperature;

means for eventually heating at least a portion of the water in the boiler with a second portion of the first amount of heat;

means for generating the stream of steam at the pressure between about 5 psig and about 60 psig in the boiler; and means for eventually heating with at least a portion of the stream of steam the boiler feed water preparation system or another internal system in direct or indirect fluid communication with the steam-hydrocarbon reformer.

12. A system as in claim 11, further comprising:

a second boiler feed water heater and a third boiler feed water heater;

means for feeding a first portion of a third stream of the water from the first boiler feed water heater to the second boiler feed water heater;

means for feeding a second portion of the third stream of the water from the first boiler feed water heater to the third boiler feed water heater;

means for eventually heating at least a portion of the first portion of the third stream of the water fed to the second boiler feed water heater with a third portion of the first amount of heat at a second temperature higher than the first temperature; and means for eventually heating at least a portion of the second portion of the third stream of the water fed to the third boiler feed water heater with a first portion of the second amount of heat at a primary temperature.

13. A system as in claim 12, further comprising:
a fuel preheater;
means for feeding a flow of a fuel to the fuel preheater; and
means for eventually heating at least a portion of the fuel in the fuel preheater with a fourth portion of the first amount of heat at a third temperature lower than the second temperature.

14. A system as in claim 11, further comprising:
an oxidant preheater;
a source of a stream of an oxidant;
means for heating at least a portion of the stream of the oxidant with an other portion of the stream of steam or with a flow of warm air from a cooling train or from an other internal source in direct or indirect fluid communication with the steam-hydrocarbon reformer;
means for feeding the heated stream of the oxidant to the oxidant preheater; and
means for eventually further heating the at least a portion of the heated stream of the oxidant in the first oxidant preheater with a second portion of the second amount of heat at a secondary temperature.

15. A system as in claim 11, further comprising:
an economizer;
means for transmitting a stream of at least a portion of the water from the water heater through the economizer before eventually feeding the at least a portion of the portion of the water to the boiler feed water preparation system; and
means for eventually heating the stream of the at least a portion of the water being transmitted through the economizer with a second portion of the second amount of heat at another temperature.

16. A system as in claim 14, wherein the oxidant is air or another gaseous mixture having an oxygen concentration greater than about 10%.

17. A system as in claim 11, wherein the generated stream of steam is at a pressure between about 5 psig and about 40 psig.

18. A system for steam reforming hydrocarbons in a steam-hydrocarbon reformer receiving a flow of hydrocarbon feed and a flow of steam, the steam-hydrocarbon reformer generating a flow of a process gas containing a first amount of heat and a flow of a flue gas containing a second amount of heat, comprising:
a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 40 psig;
means for feeding a flow of water to the water heater;

means for eventually feeding at least a portion of the water from the water heater to the boiler feed water preparation system;
means for feeding a first stream of the water to the boiler from the boiler feed water preparation system;
means for feeding a second stream of the water from the boiler feed water preparation system to the first boiler feed water heater;
means for eventually heating at least a portion of the second stream of the water fed to the first boiler feed water heater with a first portion of the first amount of heat at a first temperature;
means for eventually heating at least a portion of the water in the boiler with a second portion of the first amount of heat;
means for generating the stream of steam at the pressure between about 5 psig and about 40 psig in the boiler;
means for eventually heating with at least a portion of the stream of steam the boiler feed water preparation system or another internal system in direct or indirect fluid communication with the steam-hydrocarbon reformer;
means for providing a second boiler feed water heater and a third boiler feed water heater;
means for feeding a first portion of a third stream of the water from the first boiler feed water heater to the second boiler feed water heater;
means for feeding a second portion of the third stream of the water from the first boiler feed water heater to the third boiler feed water heater;
means for eventually heating at least a portion of the first portion of the third stream of the water fed to the second boiler feed water heater with a third portion of the first amount of heat at a second temperature higher than the first temperature;
means for eventually heating at least a portion of the second portion of the third stream of the water fed to the third boiler feed water heater with a first portion of the second amount of heat at a primary temperature;
an oxidant preheater;
a source of a stream of an oxidant;
means for heating at least a portion of the stream of the oxidant with an other portion of the stream of steam or with a flow of warm air from a cooling train or from an other internal source in direct or indirect fluid communication with the steam-hydrocarbon reformer;
means for feeding the heated stream of the oxidant to the oxidant preheater; and
means for eventually further heating the at least a portion of the heated stream of the oxidant in the oxidant preheater with a second portion of the second amount of heat at a secondary temperature lower than the primary temperature.

19. A system for steam reforming hydrocarbons in a steam-hydrocarbon reformer receiving a flow of hydrocarbon feed and a flow of steam, the steam-hydrocarbon reformer generating a flow of a process gas containing a first amount of heat and a flow of a flue gas containing a second amount of heat, comprising:
a water heater, a boiler feed water preparation system in fluid communication with the water heater, a boiler in fluid communication with the boiler feed water preparation system, and a first boiler feed water heater in fluid communication with the boiler feed water preparation system, the boiler being adapted to generate a stream of steam at a pressure between about 5 psig and about 40 psig;

means for feeding a flow of water to the water heater;
means for eventually feeding at least a portion of the water from the water heater to the boiler feed water preparation system;
means for feeding a first stream of the water to the boiler from the boiler feed water preparation system;
means for feeding a second stream of the water from the boiler feed water preparation system to the first boiler feed water heater;
means for eventually heating at least a portion of the second stream of the water fed to the first boiler feed water heater with a first portion of the first amount of heat at a first temperature;
means for eventually heating at least a portion of the water in the boiler with a second portion of the first amount of heat;
means for generating the stream of steam at the pressure between about 5 psig and about 40 psig in the boiler;
means for eventually heating with at least a portion of the stream of steam the boiler feed water preparation system or another internal system in direct or indirect fluid communication with the steam-hydrocarbon reformer;
a second boiler feed water heater and a third boiler feed water heater;
means for feeding a first portion of a third stream of the water from the first boiler feed water heater to the second boiler feed water heater;
means for feeding a second portion of the third stream of the water from the first boiler feed water heater to the third boiler feed water heater;
means for eventually heating at least a portion of the first portion of the third stream of the water fed to the second boiler feed water heater with a third portion of the first amount of heat at a second temperature higher than the first temperature;
means for eventually heating at least a portion of the second portion of the third stream of the water fed to the third boiler feed water heater with a first portion of the second amount of heat at a primary temperature;
an economizer;
means for transmitting a stream of at least a portion of the water from the water heater through the economizer before eventually feeding the at least a portion of the portion of the water to the boiler feed water preparation system; and
means for eventually heating the stream of the at least a portion of the water being transmitted through the economizer with a second portion of the second amount of heat at another temperature lower than the secondary temperature.

20. A system as in claim 18, wherein the oxidant is a gaseous mixture other than air having an oxygen concentration greater than about 10%.

* * * * *